United States Patent
Narsimharao et al.

(10) Patent No.: US 9,734,588 B2
(45) Date of Patent: Aug. 15, 2017

(54) METHOD AND SYSTEM FOR COMPRESSING A VIDEO USING BACKGROUND SUBTRACTION AND CHANGE DETECTION IN VIDEOS

(71) Applicant: Tata Consultancy Services Limited, Mumbai (IN)

(72) Inventors: Narendra Narsimharao, Bangalore (IN); Mariswamy Girish Chandra, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/069,580

(22) Filed: Mar. 14, 2016

(65) Prior Publication Data

US 2017/0053418 A1    Feb. 23, 2017

(30) Foreign Application Priority Data

Aug. 19, 2015   (IN) .......................... 3156/MUM/2015

(51) Int. Cl.
| | |
|---|---|
| G06K 9/36 | (2006.01) |
| G06K 9/46 | (2006.01) |
| G06T 7/20 | (2017.01) |
| H04N 7/18 | (2006.01) |
| H04N 19/63 | (2014.01) |

(52) U.S. Cl.
CPC ............ G06T 7/206 (2013.01); G06T 7/2053 (2013.01); H04N 7/183 (2013.01); H04N 19/63 (2014.11); G06T 2207/20144 (2013.01)

(58) Field of Classification Search
CPC ......... G06T 9/007; H04N 19/63; H04N 7/183
See application file for complete search history.

(56) References Cited

U.S. PATENT DOCUMENTS

| | | | |
|---|---|---|---|
| 7,516,888 B1 | 4/2009 | Kundu et al. | |
| 9,070,012 B1* | 6/2015 | Sieracki | ................... G06K 9/40 |
| 2008/0013847 A1* | 1/2008 | Li | ......................... H04N 19/147 |
| | | | 382/248 |

FOREIGN PATENT DOCUMENTS

CN         102013022         4/2011

OTHER PUBLICATIONS

Sen-Ching, S. Cheung et al., "Robust Background Subtraction with Foreground Validation for Urban Traffic Video", EURASIP Journal on Applied Signal Processing, vol. 14, pp. 2330-2340, (2005).

* cited by examiner

*Primary Examiner* — Phuoc Tran
(74) *Attorney, Agent, or Firm* — Finnegan, Henderson, Farabow, Garrett & Dunner LLP

(57) ABSTRACT

A method and system is provided for the compression of a video captured from a static camera. A background image and an original image is captured from the static camera. A foreground object is extracted by taking the difference between the transformed original image and the transformed background image. The foreground object is represented as a sparse vector using wavelets. The method revolves around the compressive sensing framework by ingeniously using the complex field BCH codes and the syndrome as measurements to achieve robust background subtraction using reduced number of measurements. The reconstruction is carried out by a Complex-field BCH decoder coupled with block based implementation. According to another embodiment, an adaptive techniques has also been proposed for acquiring the measurements required for recovering the images.

8 Claims, 5 Drawing Sheets

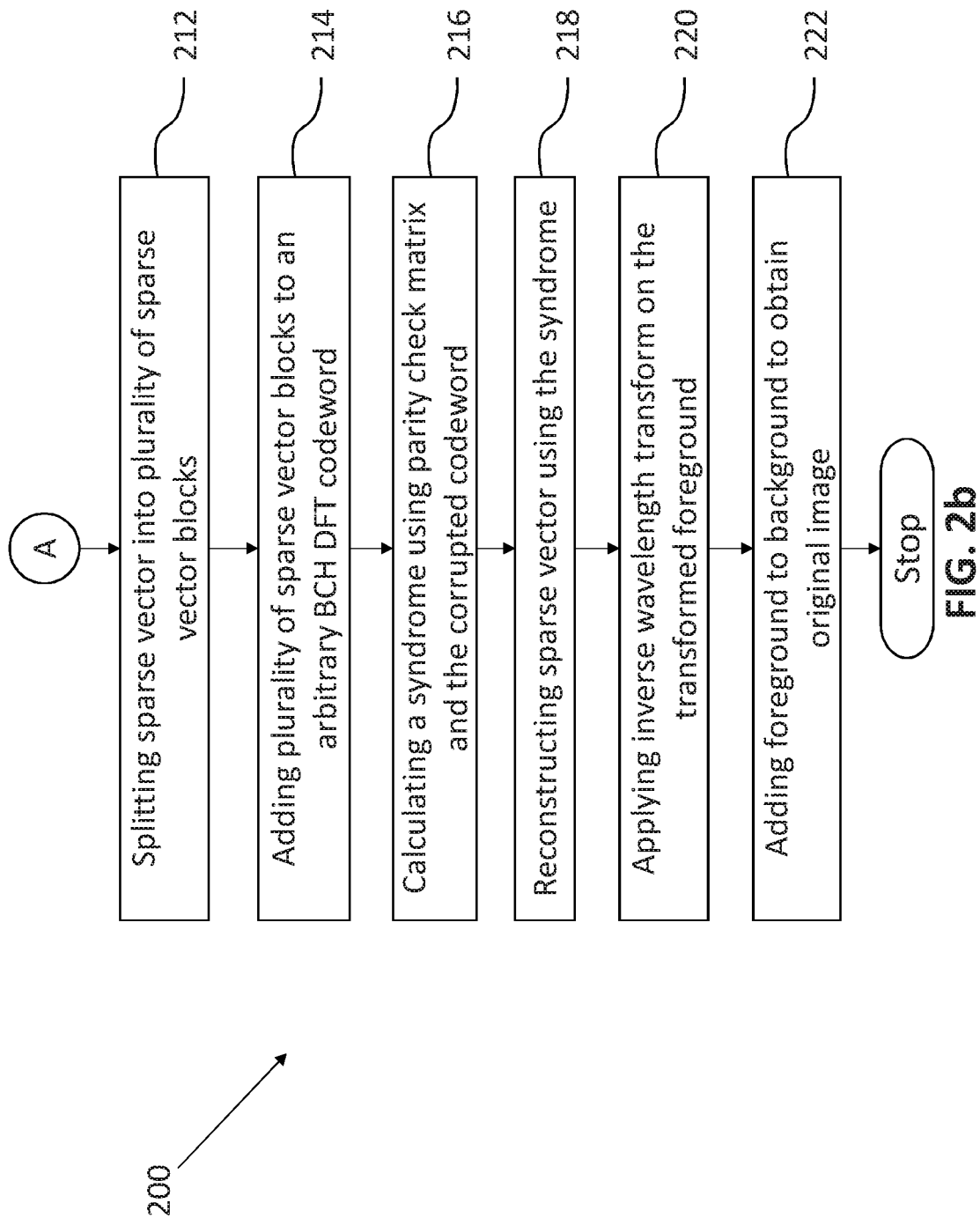

METHOD AND SYSTEM FOR COMPRESSING A VIDEO USING BACKGROUND SUBTRACTION AND CHANGE DETECTION IN VIDEOS

PRIORITY CLAIM

The present application claims priority to Indian Patent Application No. 3156/MUM/2015, filed on 19 Aug. 2015 the entirety of which is hereby incorporated by reference.

TECHNICAL FIELD

The present application generally relates to video processing. More particularly, but not specifically, the invention provides a method and system for the compression of video captured from a static camera.

BACKGROUND

The video surveillance using CCTV cameras and other types of static camera have become very common these days. As a result, a vast amount of video data captured from these cameras are generating every day. The storage and transmission of this video data proposes a new challenge. Generally, the video data captured from the static cameras include a lot of data when there is no activity in front of the camera, this data is irrelevant to the user. The relevant information include only when there is a change in the foreground with respect to the background. Thus, it would be recommended if only the relevant information is stored and rest other is discarded. By doing this we can reduce the amount of data which need to be stored.

Various techniques and methods have been used for the compression of video data. One of the technique uses detecting and analyzing the background in the video data. Robust detection of moving objects in video streams is a significant issue for video surveillance. The compression of video data can be performed using background subtraction. Background Subtraction (BS) is one of a common and widely used technique for detecting a foreground (the pixels belonging to moving objects in the scene) using the difference between the current frame and a background model. BS methods are used in a variety of applications ranging from video surveillance, change detection to RADAR, SONAR imaging. Existing schemes use traditional approaches for background subtraction like frame differencing, mean filtering, median filtering, linear predictive filtering, Kalman filtering and so on. They focus is mainly on detecting the foreground rather than focusing on the inherent problems of storage/transmission of the video data.

Another method involves analyzing the foreground as moving object, shadow, and ghost by combining the motion information. In this case, the computation cost is relatively expensive for real-time video surveillance systems because of the computation of optical flow. Recently, the mixture of Gaussians method have been used because it can deal with slow lighting changes, periodical motions from clutter background, slow moving objects, long term scene changes, and camera noises. But it cannot adapt to the quick lighting changes and cannot handle shadows very well.

The compressive sensing is one of the recent technique to be used for background subtraction. This method involves mapping the sparse foreground reconstruction to a compressive sensing framework where object silhouettes are recovered directly from the compressed measurements.

Though various other methods have been used for compressing the video data captured from the static camera. None of the method are robust enough and cost effective.

SUMMARY OF THE INVENTION

Embodiments of the present disclosure present technological improvements as solutions to one or more of the above-mentioned technical problems recognized by the inventors in conventional systems.

The present invention provides a method for compressing the size of video data captured from a static camera. A background image and an original image is provided to a processor and a wavelet transform is applied to sparse the background image and the original image. Then a difference is taken between the transformed background image and the transformed original image to generate a transformed foreground. The thresholding is applied on the transformed foreground to generate a plurality of zero blocks and a sparse vector. The plurality of zero blocks are combined using a run-length encoding and the sparse vector is split in to a plurality of sparse vector blocks of a predefined length. Each of the plurality of sparse vectors blocks are added to to an arbitrary BCH-DFT codeword to generate a corrupted codeword. In the next step a syndrome is calculated using a parity check matrix and the corrupted codeword. The sparse vector is then reconstructed for each of the plurality of sparse vector blocks using a decoder. And finally an inverse wavelet transform is applied on the transformed foreground to regenerate the foreground and the foreground then added to the background to recover the compressed original image.

According to another embodiment the present invention also provides a system for compressing the size of video data captured from a static camera. The system comprises a processor and database. The processor further includes a plurality of modules, a sparsifying module, a differencing module, a thresholding module, a run length encoding module, a splitting block, a first addition module, a syndrome computation module, a decoder, an inverse transformation module and a second addition module for performing various functions as mentioned in the method above According to another embodiment of the invention also provides a method for compressing the video captured from the static camera using an adaptive technique. In this technique the length of syndrome changes in foreground are handled elegantly by changing the rate of the codeword block.

According to another embodiment, the invention also provides a non-transitory computer-readable medium having embodied thereon a computer program for compressing a video captured from a static camera. Initially a background image and an original image is provided to a processor and a wavelet transform is applied to sparse the background image and the original image. Then a difference is taken between the transformed background image and the transformed original image to generate a transformed foreground. The thresholding is applied on the transformed foreground to generate a plurality of zero blocks and a sparse vector. The plurality of zero blocks are combined using a run-length encoding and the sparse vector is split in to a plurality of sparse vector blocks of a predefined length. Each of the plurality of sparse vectors blocks are added to an arbitrary BCH-DFT codeword to generate a corrupted codeword. In the next step a syndrome is calculated using a parity check matrix and the corrupted codeword. The sparse vector is then reconstructed for each of the plurality of sparse vector blocks using a decoder. And finally an inverse wavelet transform is applied on the transformed foreground to regenerate the foreground and the foreground then added to the background to recover the compressed original image.

It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings:

FIGS. 2a and 2b show a flow chart illustrating steps involved in the compression of video data using a static technique in accordance with an embodiment of the invention.

DETAILED DESCRIPTION OF THE INVENTION

Figure 1:
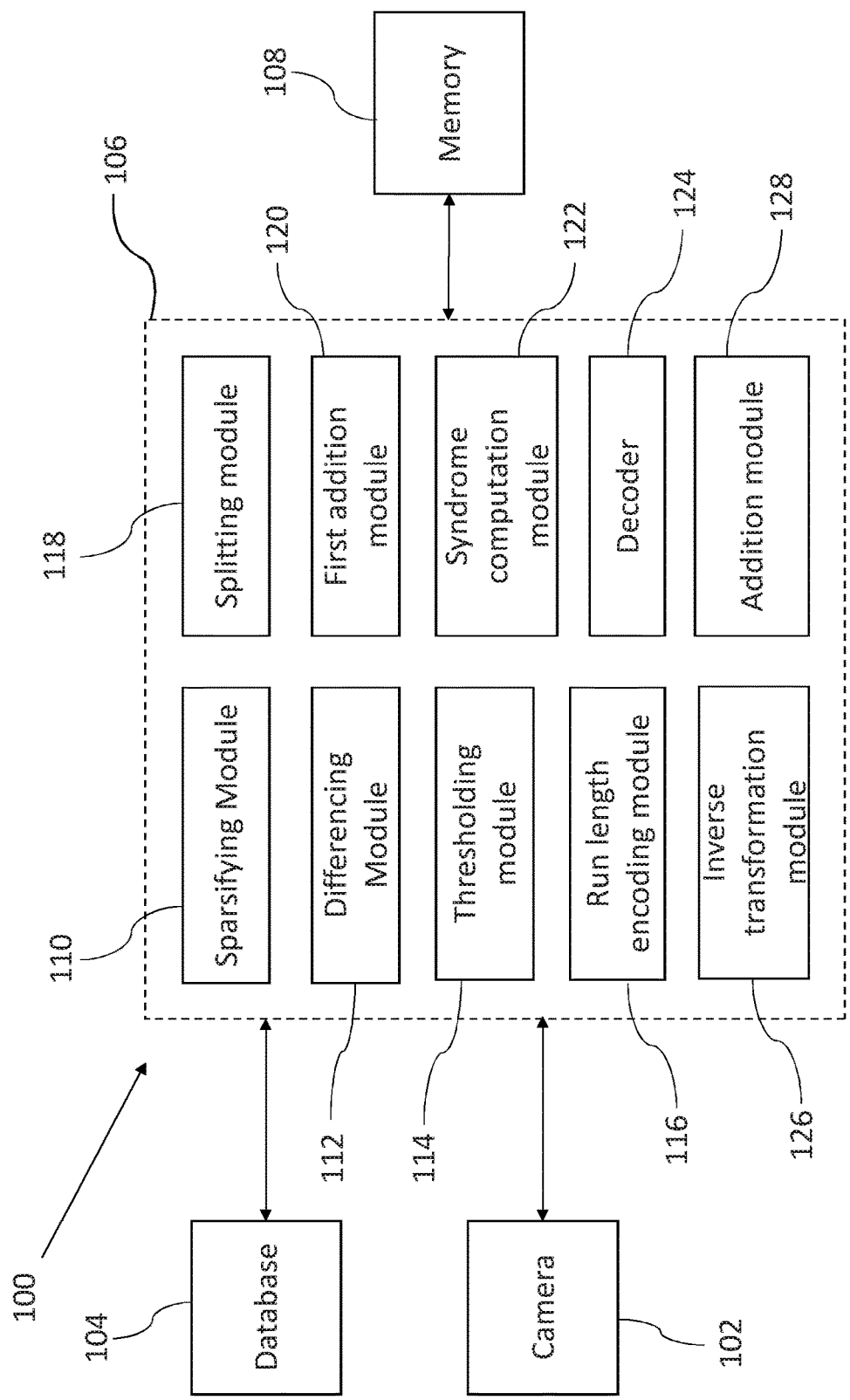
FIG. 1 shows a block diagram illustrating architecture of a system for the compression of video data captured from a static camera in accordance with an embodiment of the invention.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present invention provides a processor implemented method and system for compressing the size of video data captured from a static camera. A background image and an original image is provided to a processor and a wavelet transform is applied to sparse the background image and the original image. Then a difference is taken between the transformed background image and the transformed original image to generate a transformed foreground. The thresholding is applied on the transformed foreground to generate a plurality of zero blocks and a sparse vector. The plurality of zero blocks are combined using a run-length encoding and the sparse vector is split in to a plurality of sparse vector blocks of a predefined length. Each of the plurality of sparse vectors blocks are added to an arbitrary BCH-DFT codeword to generate a corrupted codeword. In the next step a syndrome is calculated using a parity check matrix and the corrupted codeword. The sparse vector is then reconstructed for each of the plurality of sparse vector blocks using a decoder. And finally an inverse wavelet transform is applied on the transformed foreground to regenerate the foreground and the foreground then added to the background to recover the compressed original image.

FIG. 1 illustrates a schematic block diagram of a system 100 for compressing a video captured from a static camera according to an illustrative embodiment of the present invention. The static camera is a fixed camera in which the field of vision remains constant and anything coming in front changes the field of vision. The image which is remains in front of the camera is called as a background image. Whenever there is a movement in front of the static camera an image is captured, this is called as an original image. Anything which is coming in front of the background image is called as a foreground. The original image is captured from the static camera when there is a change in the foreground with respect to the background image of the field of vision of the static camera.

The system 100 is configured to compress the size of the video using a technique of compressive sensing and background subtraction. The novel technique for background subtraction combines wavelet transform and complex field Bose-Chaudhuri-Hocquenghem (BCH) codes to achieve a more robust foreground detection. According to an embodiment of the present invention, the foreground is represented as a sparse vector.

According to an embodiment of the invention, the system 100 comprises a static camera 102, a database 104, a processor 106 and a memory 108 as shown in FIG. 1. The database 104 is configured to store the data generated by the static camera 102. The system 100 can use any type of static camera available in the art. The database 104 stores the background image and the original image. The database 104 is communicatively coupled with the processor 106. The database 104 may be coupled wirelessly, wired or a combination thereof. The processor 106 can be implemented as one or more of a microprocessor, a microcomputer, a microcontroller, digital signal processor, a signal processing unit, a logic device or/and any other device that manipulate signals based on operational instructions. The processor 106 can also fetch and execute computer readable instructions stored in the memory 108.

The processor 106 includes a plurality of modules for performing various functions of the system 100. The plurality of modules include a sparsifying module 110, a differencing module 112, a thresholding module 114 a run length encoding module 116, a splitting block 118, a first addition module 120, a syndrome computation module 122, a decoder 124, an inverse transformation module 126 and a second addition module 128.

The sparsifying module 110 applies a wavelet transform to the background image and the original image. In an embodiment, the wavelet transformation is done using HAAR wavelets. It should be appreciated that the use of any other transformation method is well within the scope of this invention. The process of transformation results in the generation of a transformed background image and a transformed original image. The differencing module 112 then takes the difference between the transformed background image and the transformed original image. The differencing results in the generation of the transformed foreground.

The thresholding module 114 is configured to perform the wavelet thresholding in the transformed foreground. The wavelet thresholding retains only significant coefficients of the transformed foreground, i.e., any coefficients with magnitude less than $\lambda$ are made zeros where $\lambda$ is a thresholding parameter. The process of thresholding results in generation of a plurality of zero blocks and a sparse vector. The plurality of zero blocks correspond to the coefficients with magnitude less than $\lambda$. The plurality of zero blocks are then combined using the run length encoding by the run length encoding module 116. The combination of the plurality of zero blocks using the run length encoding results in compression of the size of the transformed foreground.

According to an embodiment of the invention, the link between the compressive sensing and the error correction can be explained in terms of BCH-DFT codes for Compressive Sensing. It should be appreciated that any vector can be treated as a summation of the syndrome and codeword. The vector can be written uniquely as a summation of a syndrome and a Reed-Solomon codeword of length n and dimension k over a complex field. Thus, if we generate a sparse vector corresponding to the foreground image and treat it as an error vector, adding that to any typical codeword of appropriate length BCH-DFT codeword and multiplying the resultant sum vector with the corresponding parity-check matrix gives out the syndrome (Compressive Sensing measurements). These measurements can then be decoded using BCH-DFT decoding algorithms.

The link between compressive sensing (CS) and Error Correction including some aspects of complex BCH codes and decoding can be explained as follows. If the signal x of length n is s-sparse in a certain basis/dictionary, according to CS theory, it can be recovered from m measurements (represented by y) where m<<n. It can given using following equation 1.

$$y = \phi x = \phi \psi x_s = A x_s \qquad 1$$

where $\phi$ is an m×n Measurement matrix and $\psi$ is the sparsifying basis/dictionary. If the matrix A satisfies Restricted Isometric Property (RIP) or coherence property, one can reconstruct x from the measurements y using any of the many available algorithms, like, different flavors of pursuits, homotopy, etc.

The link to the error-correction codes follows next. As well established by now, the correspondence is with the error correction codes in the complex field instead of the conventional Galois Field (GF). We start with uncoded data $u \in C^k$ where $C^K$ represents the complex field of dimension k and generate the codeword c by operating the generator matrix $G \in C^n$ on u as $c = Gu$.

The generated codeword is of length n>k, introducing the redundancy. These codewords may be corrupted by the introduction of an error vector e. The error vector however, is sparse in nature as only some positions out of n tend to be in error. The corrupted codeword can be represented as c'=c+e. To recover the exact codeword, need is to reconstruct the error vector e from c'. To aid in this process, we use the parity check matrix H which maps our problem into the CS domain as mentioned in equation 2

$$H^*c' = H^*(c+e) = H^*e \qquad 2$$

Since $H^*c = H^*(Gu) = (H^*G)u = 0$. We now reduce our problem to recover e from the syndrome $s = H^*e$ which has a dimension n □ k. In other words, we try to estimate the sparse signal e using just m=n−k measurements. In this scenario, the basis vector $\psi$ is the identity matrix I, the parity check matrix H is the measurement matrix, and the sparse signal is the error vector e. This is now a CS problem which if required can be solved using standard $l_1$ norm minimization (basis pursuit) or other algorithms.

According to an embodiment, the sparse vector is split into a plurality of sparse vectors blocks of a predefined length using the splitting block 118. The block wise approach makes the process of compression more elegant as compared to the techniques explained in the prior art. In this embodiment, the system 100 is using a static technique. In an example, the predefined length is taken as 100. Each of the plurality of sparse vector blocks is considered as error in the BCH-DFT codewords. Therefore, each of the plurality of sparse vector blocks are added to the arbitrary BCH-DFT codeword to generate a corrupted codeword using the first addition module 120. Further, the syndrome is calculated by multiplying the corrupted codeword with a parity check matrix. This function is performed by the syndrome computation module 122 present in the processor 106.

According to an embodiment of the invention, the static technique has been used for the acquiring the measurements required for recovering the sparse vector. In the static technique, the length of the syndrome remains constant. The length of syndrome is the difference between the predefined length and an information vector. The length of information vector is decided by the sparsity of the sparse vector blocks. It should be appreciated that going forward in this disclosure, the information vector and the sparsity can be used interchangeably.

The sparse vector is then reconstructed using the decoder 124. The decoder 124 receives the syndrome as an input. The decoder 124 is running a Peterson-Gorenstein-Zierler (PGZ) algorithm which reconstructs the sparse vector using the syndrome. It should be appreciated that the decoder 124 can also use any other kind of algorithm such as Berlekamp-Massey algorithm for the reconstructing the sparse vector. The calculation of the sparse vector of each block is possible if the sparsity of the block is less than or equal to the number of correctable errors. The block based approach used in the present embodiment results in decoding of shorter length codewords. This sparse vector is representative of the sparse foreground.

An inverse wavelet transform is applied on the sparse foreground using the inverse transformation module 126. The inverse wavelet transform results in the generation of the foreground. In an embodiment, HAAR wavelet inverse transformation has been used. And finally, the foreground is added to the background image to recover the original image using the second addition module 128. The recovered original image is compressed in size as only the relevant information is recovered.

According to another embodiment of the invention, an adaptive technique can also be used for the acquiring the measurements required for recovering the sparse vector. In the adaptive technique, the length of the syndrome is not fixed. The dimensions of the parity check matrix is changed. The sparse vector is split into a plurality of sparse vectors blocks. The sparsity of each block is calculated. A lookup table is constructed based on the empirical studies to calculate the rate of the codeword based on the sparsity. This is used to set the rate and in turn change the number of measurements required for successful reconstruction of the sparse vector.

Figure 2A:
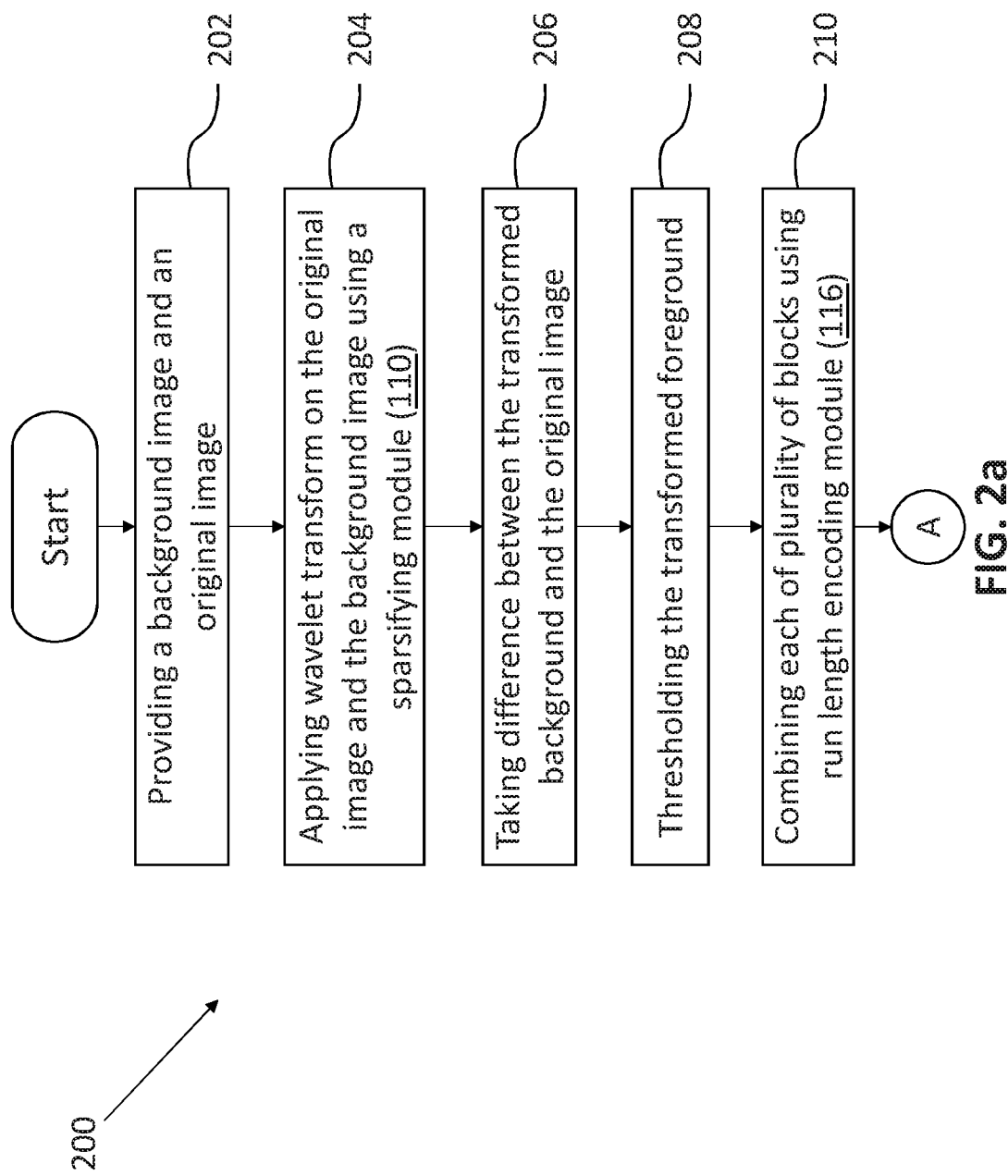

A flowchart 200 illustrating the steps involved in the compression of video data captured from the static camera is shown in FIGS. 2a and 2b according to an illustrative embodiment of the invention. The flowchart illustrates a static technique used for acquiring the measurements required for recovering the sparse vector. At step 202, the background image and original image are provided. The background image and original image can be represented using vectors $X_b$ and $X_o$ respectively. The background image $X_b$ and original image $X_o$ are captured using the static camera 102. At step 204, the wavelet transformation is applied on the background image $X_b$ and original image $X_o$ using the sparsifying module 110. The transformation results in the generation of the transformed background image and the transformed original image. In an embodiment, HAAR wavelet transform has been used for transformation. In the next step 206, a difference is taken between the transformed background image and the transformed original image using the differencing module 112, this results in the generation of the transformed foreground.

At step 208, the only significant coefficients of the transformed foreground are retained by a process of thresholding using the thresholding module 114. The coefficients which are less than the thresholding parameter λ are considered as the plurality of zero blocks and the coefficients which are more than the thresholding parameter λ can be represented as the sparse vector $X_f$. At step 210, the plurality of zero blocks are combined using the run length encoding module 116. The combination results in the reduction of the size of the video. At step 212, the sparse vector $X_f$ is split in to the plurality of sparse vector blocks, represented as $X_{fb}$, of the predefined length n. The plurality of sparse vector blocks $X_{fb}$ are considered as error in the BCH-DFT codeword. At step 214, the plurality of sparse vector blocks $X_{fb}$ are added to an arbitrary BCH-DFT codeword using the first addition module 120. This results in generation of the corrupted codeword R. Thus, the corrupted codeword can be given by equation no. 3

$$R=C+X_{fb} \quad\quad\quad 3$$

wherein, C is the BCH-DFT codeword of length n.

In the next step 216, the syndrome S is calculated using the parity check matrix H and the corrupted codeword R. This can be given by equation no. 4

$$S=H*R \quad\quad\quad 4$$

In the next step 218, sparse vector $X_f$ is reconstructed. The syndrome S is then fed to the decoder 124 for the reconstruction of the sparse vector $X_f$. The decoder 124 is running the Peterson-Gorenstein-Zierler (PGZ) algorithm which reconstructs the sparse vector $X_f$. The sparse vector $X_f$ is the representation of the transformed foreground. At step 220, the inverse wavelet transform using HAAR wavelet is applied to the transformed foreground. And finally at step 222, the foreground is added to the background image $X_b$ to generate the original image $X_o$ of compressed size.

Figure 3A:
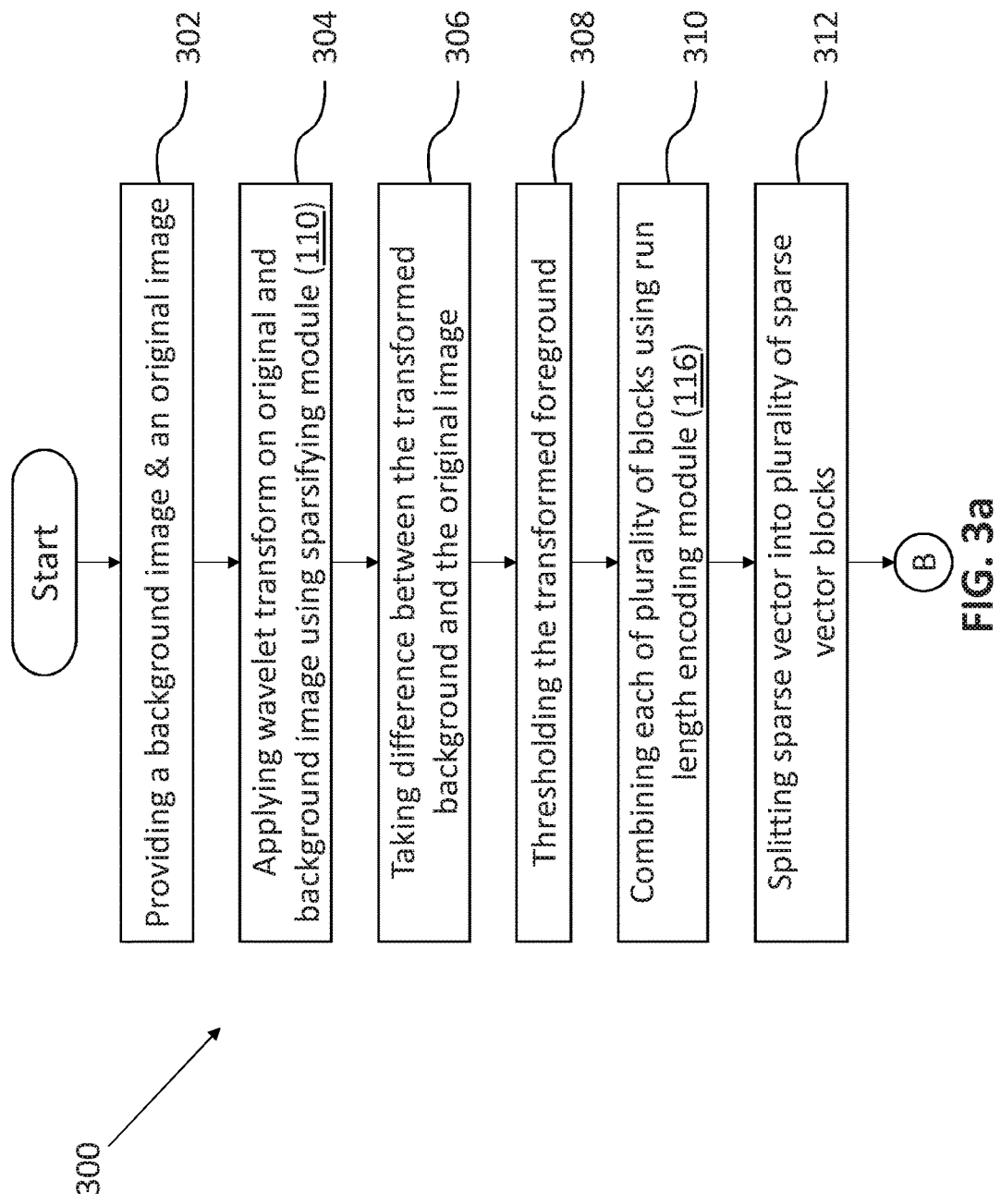
FIGS. 3a and 3b show a flow chart illustrating steps involved in the compression of video data using an adaptive technique in accordance with another embodiment of the invention.
Figure 3B:
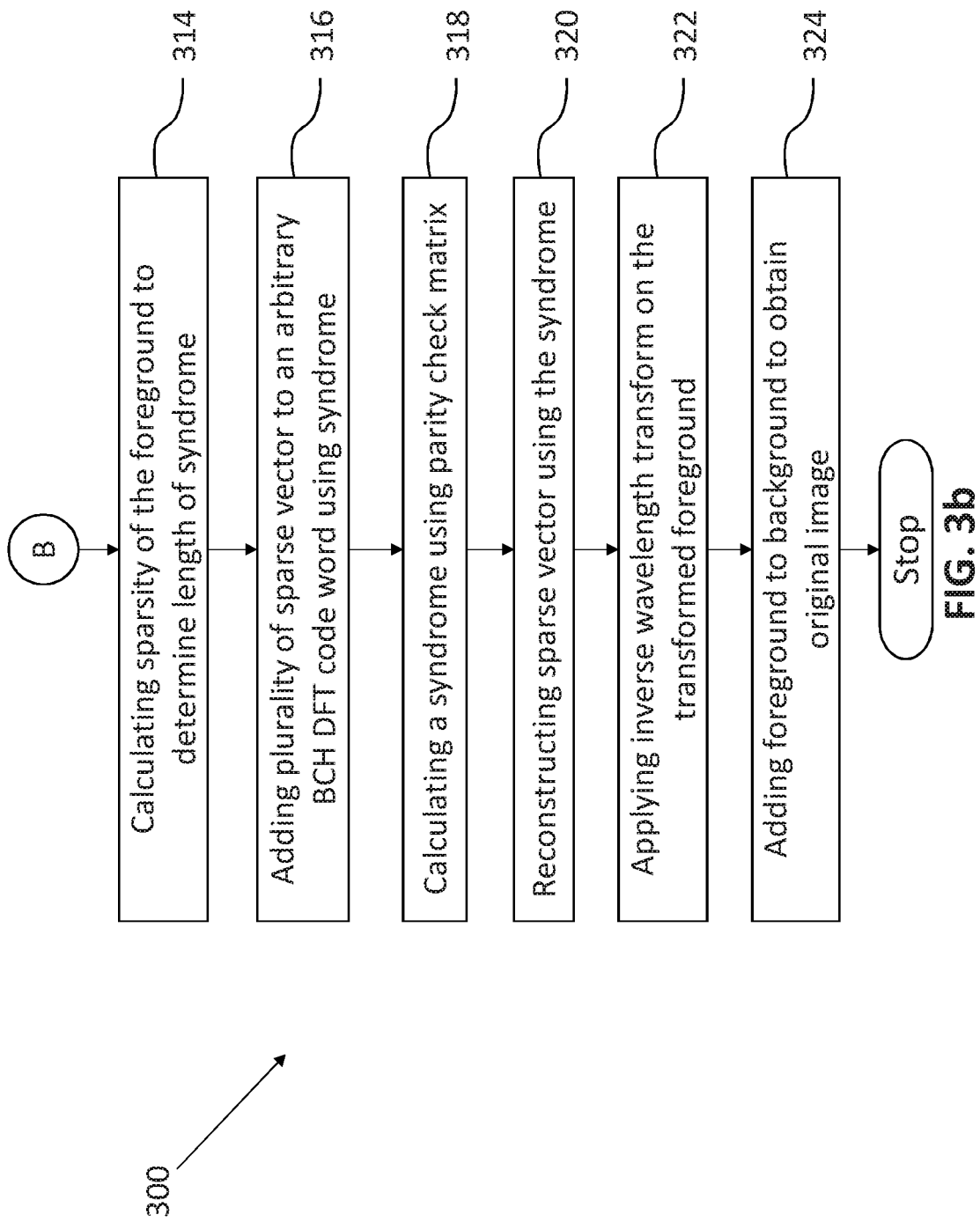

A flowchart 300 illustrating the steps involved in the compression of video data captured from the static camera is shown in FIGS. 3a and 3b according to another illustrative embodiment of the invention. The flowchart illustrates the adaptive technique used for acquiring the measurements required for recovering the sparse vector. In the adaptive technique, step 302 to step 312 are same as step 202 to step 212 of the flowchart shown in the embodiment of FIGS. 2a and 2b. The only difference between the adaptive technique and the static technique is the length of syndrome S. The length of syndrome remains constant in the static technique while the length of syndrome is variable. At step 314, the sparsity of the foreground is calculated. A look up table is constructed based on the empirical studies to calculate the rate of codeword based on the sparsity, which is then used to determine the length of the syndrome S. At step 316, the plurality of sparse vector blocks $X_{fb}$ are added to an arbitrary BCH-DFT codeword using the first addition module 120. In the next step 318, the syndrome S is calculated using the parity check matrix H and the corrupted codeword R.

In the next step 320, sparse vector $X_f$ is reconstructed. The syndrome S is then fed to the decoder 124 for the reconstruction of the sparse vector $X_f$. The decoder 124 is running the Peterson-Gorenstein-Zierler (PGZ) algorithm which reconstructs the sparse vector $X_f$. The sparse vector $X_f$ is the representation of the transformed foreground. At step 322, the inverse wavelet transform using HAAR wavelet is applied to the transformed foreground. And finally at step 324, the foreground is added to the background image $X_b$ to generate the original image $X_o$ of compressed size.

In view of the foregoing, it will be appreciated that the present invention provides a system and method for background subtraction using compressive sensing and BCH-DFT codewords to achieve a robust foreground detection. Still, it should be understood that the foregoing relates only to the exemplary embodiments of the present invention, and that numerous changes may be made thereto without departing from the spirit and scope of the invention as defined by the following claims.

What is claimed is:

1. A method for compressing a video captured from a static camera, the method comprising a processor (106) implemented steps of:
   providing a background image taken from the video stored in a database (104), wherein the background image is an image of a field of vision of the static camera (102);
   providing an original image, wherein the original image is captured from the static camera (102) when there is a change in a foreground with respect to the background image of the field of vision of the static camera (102);
   applying a wavelet transform to sparse the background image and the original image using a sparsifying module (110);
   taking the difference between the transformed background image and the transformed original image using a differencing module (112), resulting in the generation of a transformed foreground;
   applying a process of thresholding on the transformed foreground using a thresholding module (114), wherein the thresholding results in generation of a plurality of zero blocks and a sparse vector;
   combining each of the plurality of zero blocks using a run-length encoding module (116), resulting in the compression of the size of the transformed foreground;
   splitting the sparse vector in to a plurality of sparse vector blocks of a predefined length using a splitting block (118);
   adding each of the plurality of sparse vector blocks to an arbitrary BCH-DFT codeword using a first addition module (120), resulting in the generation of a corrupted codeword;
   calculating a syndrome by a syndrome computation module (122) using a parity check matrix and the corrupted codeword;
   reconstructing the sparse vector for each of the plurality of sparse vector blocks using a decoder (124);
   applying inverse wavelet transform on the transformed foreground to regenerate the foreground using an inverse transformation module (126); and
   adding the foreground to the background image to recover the original image using a second addition module (128).

2. The method of claim 1, wherein the wavelet transform is a HAAR wavelet transform.

3. The method of claim 1, wherein the process of thresholding involves comparing each the coefficients of the transformed image with a predefined thresholding parameter.

4. The method of claim 1, wherein the predefined length of the block is 100.

5. The method of claim 1, wherein the decoder is running a Peterson-Gorenstein-Zierler (PGZ) algorithm.

6. The method of claim 1 further includes step of calculating a sparsity of the foreground to determine length of a syndrome to adaptively compressing the video captured from the static camera.

7. A system for compressing a video captured from a static camera (102), the system comprising:
   a database (104) for storing the video, the video having a background image and an original image, wherein the background image is an image of a field of vision of the static camera and the original image is captured from the static camera when there is a change in a foreground with respect to the background image of the field of vision of the static camera; and
   a processor (106), the processor comprising,
   a sparsifying module (110) for applying a wavelet transform to the background image and the original image;
   a differencing module (112) for taking the difference between the transformed background image and the transformed original image resulting in generation of a transformed foreground;
   a thresholding module (114) for thresholding the transformed foreground, wherein the thresholding results in generation of a plurality of zero blocks and a sparse vector;
   a run length encoding module (116) for combining each of the plurality of zero blocks, wherein the combining results in compression of the size of the transformed foreground;
   a splitting block (118) for splitting the sparse vector in to a plurality of sparse vector blocks of a predefined length;
   a first addition module (120) for adding the plurality of sparse vector blocks to an arbitrary BCH-DFT codeword, resulting in generation of a corrupted codeword;
   a syndrome computation module (122) for computing the syndrome using a parity check matrix and the corrupted codeword;
   a decoder (124) for reconstructing the sparse vector for each of the plurality of sparse vector blocks;
   an inverse transformation module (126) for applying inverse wavelet transform on the transformed foreground to reconstruct the foreground; and
   a second addition module (128) for adding the foreground to the background image to recover the original image.

8. A non-transitory computer-readable medium having embodied thereon a computer program for compressing a video captured from a static camera, the method comprising:
   providing a background image taken from the video stored in a database (104), wherein the background image is an image of a field of vision of the static camera (102);
   providing an original image, wherein the original image is captured from the static camera (102) when there is a change in a foreground with respect to the background image of the field of vision of the static camera (102);
   applying a wavelet transform to sparse the background image and the original image using a sparsifying module (110);
   taking the difference between the transformed background image and the transformed original image using a differencing module (112), resulting in the generation of a transformed foreground;
   applying a process of thresholding on the transformed foreground using a thresholding module (114), wherein the thresholding results in generation of a plurality of zero blocks and a sparse vector;

combining each of the plurality of zero blocks using a run-length encoding module (116), resulting in the compression of the size of the transformed foreground;

splitting the sparse vector in to a plurality of sparse vector blocks of a predefined length using a splitting block (118);

adding each of the plurality of sparse vector blocks to an arbitrary BCH-DFT codeword using a first addition module (120), resulting in the generation of a corrupted codeword;

calculating a syndrome by a syndrome computation module (122) using a parity check matrix and the corrupted codeword;

reconstructing the sparse vector for each of the plurality of sparse vector blocks using a decoder (124);

applying inverse wavelet transform on the transformed foreground to regenerate the foreground using an inverse transformation module (126); and adding the foreground to the background image to recover the original image using a second addition module (128).

* * * * *